(12) United States Patent
Kokubo

(10) Patent No.: US 7,606,294 B2
(45) Date of Patent: Oct. 20, 2009

(54) CHANNEL QUALITY ESTIMATION METHOD AND RECEIVING APPARATUS

(75) Inventor: Takeshi Kokubo, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 574 days.

(21) Appl. No.: 11/110,932

(22) Filed: Apr. 21, 2005

(65) Prior Publication Data

US 2005/0238086 A1 Oct. 27, 2005

(30) Foreign Application Priority Data

Apr. 26, 2004 (JP) .............................. 2004-130070

(51) Int. Cl.
*H04B 1/00* (2006.01)
(52) U.S. Cl. .................. 375/148; 370/319; 370/320; 370/321; 370/330; 370/335; 370/342; 370/345; 370/347; 342/150; 342/151; 342/152; 342/153; 342/154; 342/155; 342/193; 342/194; 342/195; 342/196; 333/150; 333/151; 333/152; 333/153; 333/154; 333/155; 333/193; 333/194; 333/195; 333/196
(58) Field of Classification Search ........... 375/148, 375/340
See application file for complete search history.

(56) References Cited

U.S. PATENT DOCUMENTS

| | | | |
|---|---|---|---|
| 5,771,461 A | 6/1998 | Love et al. | |
| 6,532,252 B1 * | 3/2003 | Moon et al. | 375/144 |
| 7,292,552 B2 * | 11/2007 | Willenegger et al. | 370/333 |
| 7,386,030 B2 * | 6/2008 | Asghar et al. | 375/142 |
| 2003/0174675 A1 * | 9/2003 | Willenegger et al. | 370/335 |
| 2004/0203987 A1 * | 10/2004 | Butala | 455/522 |

FOREIGN PATENT DOCUMENTS

EP 1 221 777 A1 7/2002

OTHER PUBLICATIONS

"HSDPA CQI Proposal", TSG-RAN-WGI HSDPA, Motorola, XP-002330513, Apr. 9-12, 2002, pp. 1-6.

* cited by examiner

*Primary Examiner*—Shuwang Liu
*Assistant Examiner*—Dhaval Patel
(74) *Attorney, Agent, or Firm*—Oblon, Spivak, McClelland, Maier & Neustadt, L.L.P.

(57) ABSTRACT

Channel quality can be detected accurately in a wireless transmission system such as an HSDPA method.

In the case of estimating a channel quality of a signal transmitted by a Code Division Multiple Access method and of estimating the channel quality in a system having a synchronization channel not orthogonal to a channel receiving data, a noise component of a desired channel is estimated; degree of a noise component caused by the synchronization channel is estimated with respect to the estimated noise; and a channel quality of a receiving channel is detected based on the estimated degree of the noise component.

13 Claims, 7 Drawing Sheets

FIG. 1

| Relation with Threshold Value [dB] | X≤A | A<X≤B | B<X≤C | C<X≤D | D<X≤E | E<X≤F | ... | G<X≤H | H<X≤I |
|---|---|---|---|---|---|---|---|---|---|
| Channel Quality | 0 | 1 | 2 | 3 | 4 | 5 | ... | 29 | 30 |

RELATED ART

FIG. 6

| | \ | | | | Channel Quality to be Selected | | | | | |
|---|---|---|---|---|---|---|---|---|---|---|
| | | 0 | 1 | 2 | 3 | 4 | 5 | ... | 29 | 30 |
| Threshold Value Set | 1 | X≦A | A<X≦B | B<X≦C | C<X≦D | D<X≦E | E<X≦F | ... | G<X≦H | H<X≦I |
| | 2 | X≦A' | A'<X≦B' | B'<X≦C' | C'<X≦D' | D'<X≦E' | E'<X≦F' | ... | G'<X≦H' | H'<X≦I' |
| | 3 | X≦A" | A"<X≦B" | B"<X≦C" | C"<X≦D" | D"<X≦E" | E"<X≦F" | ... | G"<X≦H" | H"<X≦I" |

CHANNEL QUALITY ESTIMATION METHOD AND RECEIVING APPARATUS

CROSS REFERENCES TO RELATED APPLICATIONS

The present invention contains subject matter related to Japanese Patent Application JP 2004-130070 filed in the Japanese Patent Office on Apr. 26, 2004, the entire contents of which being incorporated herein by reference.

BACKGROUND OF THE INVENTION

1. Field of the Invention

The present invention relates to a channel quality estimation method suitable for being applied to a wireless communication terminal that performs communication using a CDMA (Code Division Multiple Access) method and a receiving apparatus that performs the channel quality estimation processing, and to a technology suitable for being applied to data reception in a wireless communication terminal of a HSDPA method, for example.

2. Description of the Related Art

As one of wireless telephone systems, a high speed downlink packet access (hereinafter referred to as HSDPA) method has been developed to obtain high speed downlink data transmission in a universal mobile telecommunications system (UMTS system) that is a system employing a W-CDMA method which is one of CDMA methods.

The HSDPA method is a communication method employing adaptive modulation to speed up downlink data transmission from a base station to a wireless communication terminal, and on the terminal side, a channel quality of a downlink user data channel is detected (in actuality estimated) and is notified to the base station using uplink.

In channel quality detection processing in related art, first, a signal to noise ratio (hereinafter referred to as SNR) of a downlink pilot channel is obtained, for example. Next, an SNR of a user data channel used in the HSDPA method is obtained from the SNR of the pilot channel. Then, the channel quality is obtained from the SNR of the user data channel.

With respect to the processing of obtaining the channel quality, an explanation is made in detail, in which signal power and noise power are obtained from the following expressions of [Formula 1] and [Formula 2], and the SNR of the pilot channel is calculated from an expression of [Formula 3] using both the power.

$$S = \left| \frac{1}{N_1} \sum_{i=j}^{N_1} \text{pilot\_symbol}_i \right|^2 \quad \text{[Formula 1]}$$

$$N = \frac{1}{N_1} \sum_{i=j}^{N_1} (|\text{pilot\_symbol}_i - S|^2) \quad \text{[Formula 2]}$$

$$\text{Pilot\_SNR} = 10 \cdot \log_{10}(S/N) \text{ [dB]} \quad \text{[Formula 3]}$$

where
pilot symbol: pilot channel after demodulation
S: signal power
N: noise power
Pilot SNR: SNR of pilot channel
$N_1$: number of pilot channel symbols used to obtain SNR of pilot channel
i: symbol number of pilot channel
j: initial number of pilot channel symbol number used for obtaining SNR are defined, respectively.

In this manner, the SNR of the user data channel which is a synchronization channel is estimated from the SNR of the pilot channel obtained from the expression of [Formula 3]. An expression of [Formula 4] is provided to calculate a Data SNR which is the SNR of the user data channel.

$$\text{Data\_SNR} = \text{Pilot\_SNR} - 10 \cdot \log_{10}(SF_{pilot}/SF_{data}) - \Gamma \text{ [dB]} \quad \text{[Formula 4]}$$

In this expression of [Formula 4], an $SF_{pilot}$ is a spreading factor (256) of the pilot channel and an $SF_{data}$ is a spreading factor (16) of the user data channel. Further, $\Gamma$ is a value of power offset. The power offset value is a difference between power of the user data channel and that of the pilot channel, which is presumed when using the channel quality of the user data channel. In the HSDPA method, a ratio of the spreading factor of the user data channel to that of the pilot channel is 1/16, and processing to make the SNR of the pilot channel into 1/16 is basically performed in the expression of [Formula 4].

The channel quality is obtained from the SNR of the user data channel obtained (estimated) as described above. Specifically, the value obtained from the expression of [Formula 4] is, for example, compared with each of threshold values from A to I in a table shown in FIG. 1, and channel quality values in 31 stages from 0 to 30 are obtained in accordance with magnitude relation to each of those threshold values. In Patent reference 1, there is a disclosure of detecting and informing a channel quality in a wireless telephone system.

[Patent reference 1] Published Japanese Patent Application No. 2003-174485

The following problems are recognized in the channel quality of related art calculated in this manner. That is, a noise component is assumed to be White Gaussian Noise (Additive White Gaussian Noise: AWGN) in the above-described expression of [Formula 1]. In addition, with respect to conversion of the spreading factor SF in the expression of [Formula 4], the noise component is assumed to be the White Gaussian Noise.

In the expression of [Formula 1], an influence of the noise component is removed by taking an average of the pilot channel symbols and the signal power is calculated. However, when there exists such noise component that the average thereof does not become zero, the noise component is not removed and the signal power may not be calculated accurately. Further, it also becomes difficult to accurately calculate the noise power which is obtained from the signal power.

In the conversion formula of the spreading factor SF, the SNR of the user data channel is also assumed to be 1/16 of the SNR of the pilot channel, however, a spreading gain may not be obtained without the premise of the White Gaussian Noise, and the relation thereof may not be obtained either.

Further, although there exists a Synchronization Channel (SCH) in the W-CDMA method that is the system to which the HSDPA method is applied, the synchronization channel does not have an orthogonal relation with other channels. Therefore, when the pilot channel is inversely spread or when the user data channel is inversely spread, the synchronization channel becomes a noise component due to a reason of not being orthogonal. Further, the noise component does not become the White Gaussian Noise but becomes a correlated noise. Accordingly, when an influence of the synchronization channel becomes large, an unexpected effect is given to the calculation results of the above-described expressions of

[Formula 1] through [Formula 3] and also a relational expression for converting the spreading factor SF may not be obtained.

A transmission timing of the synchronization channel in the W-CDMA method is explained in FIG. 2, in which a first SCH (first synchronization channel) of 256 chips and a second SCH (second synchronization channel) of 256 chips are transmitted at a predetermined interval (head portion) in each slot.

When such synchronization channels exist, the relation between the SNR of the user data channel and threshold values, which is shown in FIG. 1, in a state in which a white noise is influential in all the noise components differs from that in a state in which a noise component caused by the synchronization channel is influential in all the noise components. If the white noise is influential in the presumption when obtaining the threshold value, there may occur such a problem that the channel quality is not accurately detected when the synchronization channel becomes influential. On the contrary, if the synchronization channel is influential in the presumption when obtaining the threshold value, there may occur such a problem that the channel quality is not accurately detected when the white noise becomes influential.

In the HSDPA method, throughput of a system is raised by adaptively changing a modulation method in response to the channel quality. Therefore, in view of raising throughput of the system, it is important to notify the base station side of an accurate channel quality in any reception condition, however, the accurate channel quality has not necessarily been notified in the system of related art.

SUMMARY OF THE INVENTION

The present invention addresses the above-identified, and other problems associated with conventional methods and apparatuses and provides a wireless transmission system of this kind in which a channel quality is accurately detected.

According to an embodiment of the present invention, in the case where a channel quality of a signal transmitted by a Code Division Multiple Access method is estimated and when estimating a channel quality in a system having a synchronization channel not orthogonal to a channel which receives data, noise components of a desired channel are estimated; degree of a noise component caused by the synchronization channel is estimated with respect to the estimated noise; and a channel quality of a received channel is detected based on the estimated degree of the noise component.

By doing so, an accurate channel quality in which degree of the noise component caused by the synchronization channel is taken into consideration can be detected.

According to an embodiment of the present invention, an accurate channel quality in which degree of the noise component caused by a synchronization channel is taken into consideration can be detected, so that an accurate channel quality can be detected even in a state where a noise component caused by the synchronization channel is influential. Accordingly, by informing the communication destination of the channel quality accurately detected, a desired throughput can be obtained more easily.

BRIEF DESCRIPTION OF THE DRAWINGS

FIG. 1 is an explanatory diagram showing an example of a relation between a channel quality and threshold values in related art;

FIG. 6 is an explanatory diagram showing a relation between a channel quality and threshold values according to an embodiment of the present invention;

DETAILED DESCRIPTION OF THE PREFERRED EMBODIMENTS

Figure 2:
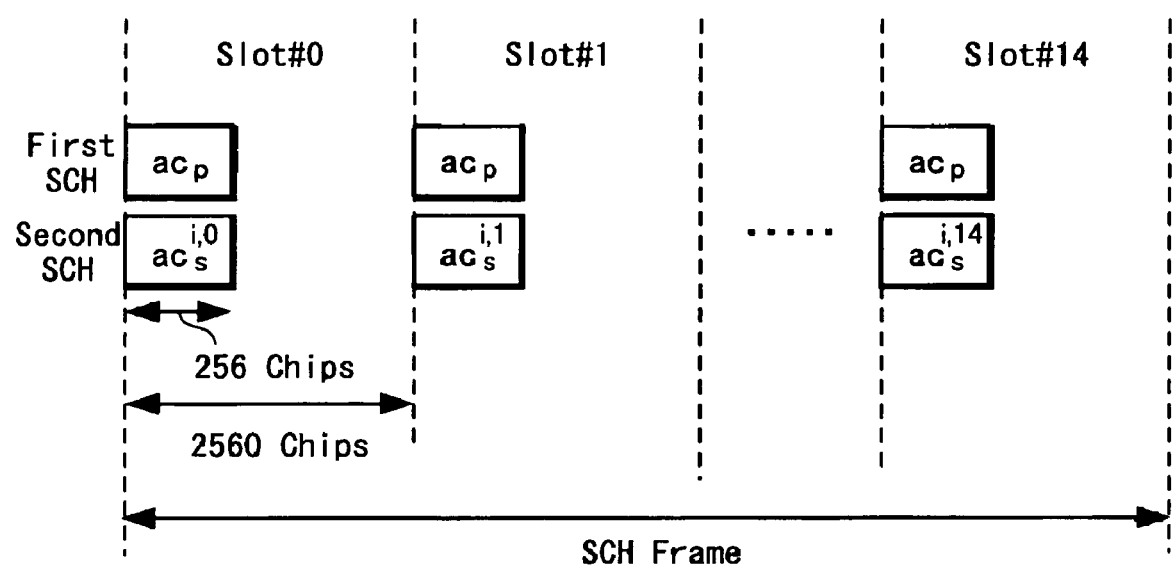
FIG. 2 is a timing chart showing an example of transmission timing of a synchronization channel.
Figure 3:
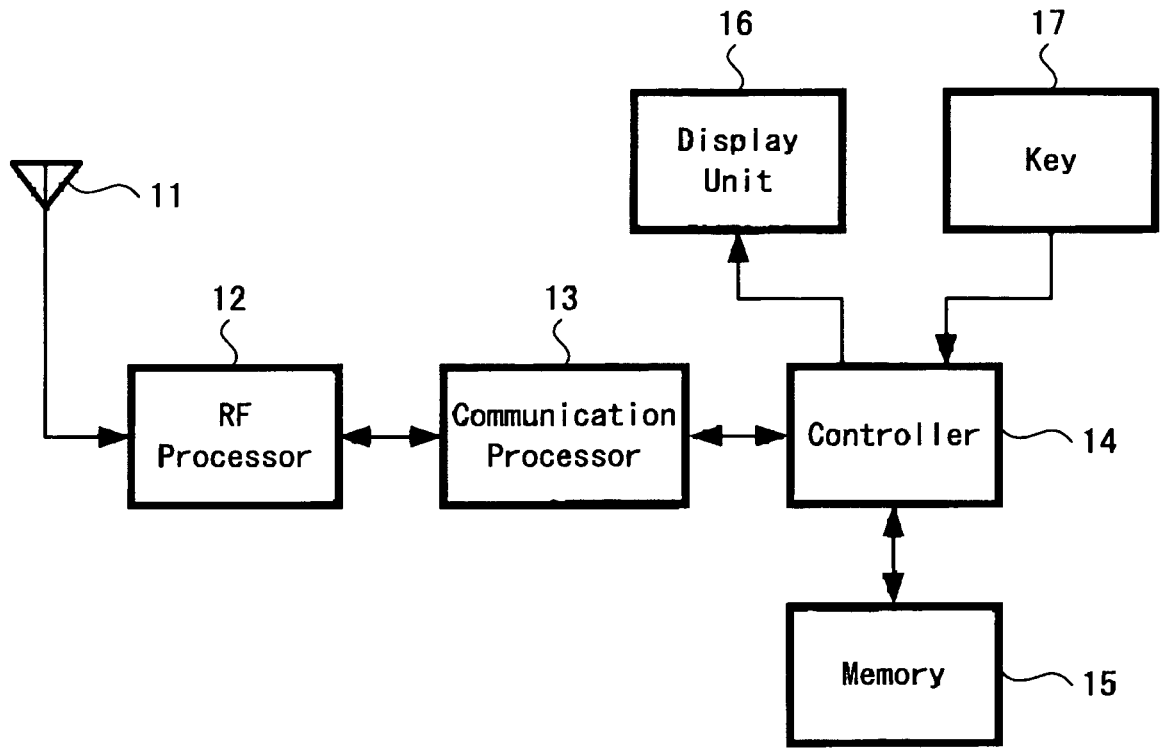
FIG. 3 is a block diagram showing an example of a configuration of a terminal according to an embodiment of the present invention.

Hereinafter, an embodiment of the present invention is explained referring to FIGS. 2 through 8.

In this embodiment, the present invention is applied to the HSDPA (High Speed Downlink Packet Access) method with which high speed downlink data transmission of the UMTS system (Universal Mobile Telecommunications System) that is the wireless telecommunication system to which the W-CDMA method is applied as explained in the description of related art. In this system, a synchronization channel (refer to FIG. 2) which is not orthogonal to a data channel or the like exists as explained above.

The HSDPA method is a system applied to a high speed downlink data transmission from a base station of a wireless telephone system to a mobile phone unit. First, an example of a configuration of the mobile phone unit (wireless communication terminal) is explained referring to FIG. 3.

In the mobile phone unit of this embodiment, an antenna 11 is connected to an RF (high frequency) processor 12, and the RF processor 12 receives a wireless signal of a predetermined frequency band and wirelessly transmits a transmission signal in a predetermined frequency band. Since the W-CDMA method is applied as a wireless connection method, a wireless connection is performed based on the CDMA (Code Division Multiple Access) method. The RF processor 12 is connected to a communication processor 13 in which demodulation of a received signal, reception data processing of demodulated data and the like are performed, and transmit data processing, modulation for transmission and the like are also performed.

The received data and control data obtained in the communication processor 13 are supplied to a controller 14 which is a control unit to control an operation of each unit of this mobile phone unit. Further, the reception data which needs to be stored is stored in a memory 15. Furthermore, received voice data for telephone call is supplied to a circuit of a voice system not shown and is output. Transmission data stored in the memory 15 and the like, is supplied to the communication processor 13 by the control of the controller 14 and transmission processing is performed. A display unit 16 is connected to the controller 14 to perform a display and the like based on the received data. Furthermore, operational information from a key 17 arranged in the mobile phone unit is supplied to the controller 14 and an operation based on a key operation is performed.

Figure 4:
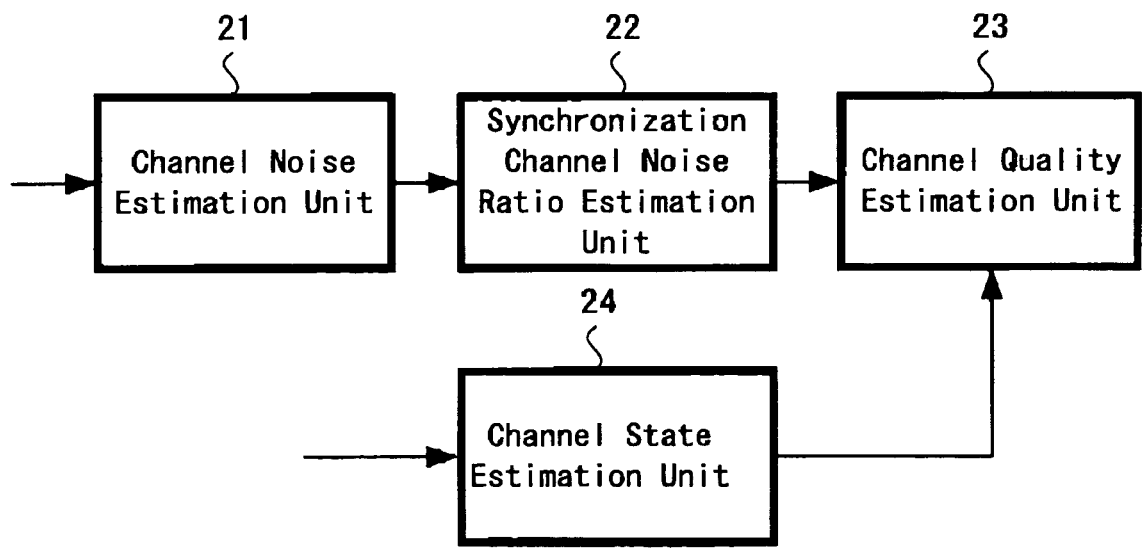
FIG. 4 is a functional-block diagram showing an example of a configuration of channel quality estimation processing according to an embodiment of the present invention.

Next, a configuration for channel quality detection processing performed in the communication processor 13 and the like by the control of the controller 14 in the mobile phone unit of this embodiment is explained referring to FIG. 4. The configuration of FIG. 4 shows functional blocks to explain a state of the channel quality detection processing, and respective functional blocks shown in FIG. 4 are not necessarily provided in an actual apparatus but may be made into software and are executed by an operation of the controller 14 or the like.

Explaining the channel quality detection processing of this embodiment based on the configuration of FIG. 4, a received signal of a desired channel (here pilot channel) is sent to a channel noise estimation unit 21. Then, a channel noise of the pilot channel is estimated. A channel noise of a user data channel is estimated from the channel noise of the pilot channel. The estimated channel noise data is sent to a synchronization channel noise ratio estimation unit 22, and the judgment is made by taking degree (ratio) of a noise component caused by the synchronization channel into consideration. The channel quality is judged in a channel quality estimation unit 23 based on the result thereof (synchronization channel noise ratio). Within the channel quality estimation unit 23, a table showing correspondence between a channel quality and a threshold value, which is described later on, is stored in the connected memory or the like. The channel quality estimation unit 23 can obtain a final value of the channel quality by referring to data in the table. Further, data made of a plurality of combinations of threshold values (threshold value sets described later on) is stored in the table of this embodiment. The combination of threshold values to be used is selected among those threshold value sets based on the synchronization channel noise ratio.

Further, when channel quality is judged in the channel quality estimation unit 23, a channel state estimated in a channel state estimation unit 24 may be taken into consideration. The channel state estimation unit 24 judges the channel quality using a traveling speed of a mobile phone unit, a presence or absence of multipath and the like, for example. Depending on the channel condition judged in the channel state estimation unit 24, processing of changing a combination of threshold values to detect the channel quality of the receiving channel, processing of changing a reference time to estimate the noise component, or the like can be performed in the channel quality estimation unit 23.

Figure 5:
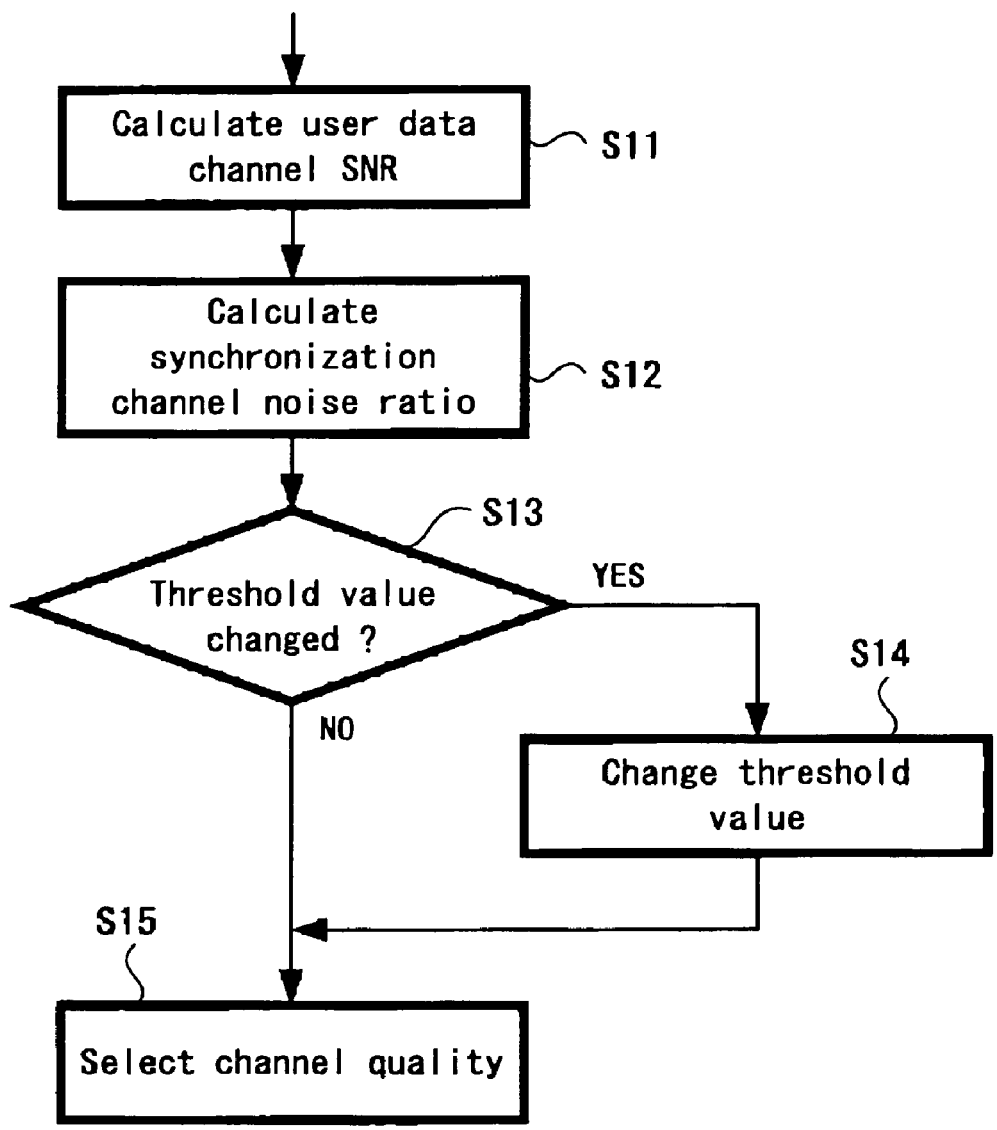
FIG. 5 is a flow chart showing an example of the channel quality estimation processing according to an embodiment of the present invention.

Next, the channel quality estimation processing according to this embodiment is explained referring to a flow chart of FIG. 5. First, a signal noise ratio (SNR) of a downlink pilot channel is obtained, and an SNR of the user data channel is obtained from this SNR of the pilot channel (step S11).

Subsequently, the noise component caused by the synchronization channel is obtained, and a synchronization channel noise ratio is detected from a ratio of this noise component to the SNR of the user data channel obtained in step S11 (step S12). As shown in FIG. 2 which has been already explained, the synchronization channel exists only for an interval of 256 chips in the head portion of each slot. The 256-chip interval is equivalent to one symbol of the pilot channel.

Hereupon, the processing of calculating the SNR of the pilot channel at the timing of transmitting the synchronization channel is shown in the following expressions of [Formula 5], [Formula 6] and [Formula 7].

$$S_{SCH} = \left| \frac{1}{N_2} \sum_{i=j}^{N_2} \text{pilot\_symbol} \right|^2 \quad \text{[Formula 5]}$$

$$N_{SCH} = \frac{1}{N_2} \sum_{i=j}^{N_2} (|\text{pilot\_symbol} - S_{SCH}|^2) \quad \text{[Formula 6]}$$

$$\text{Pilot\_SNR}_{SCH} = 10 \cdot \log_{10}(S_{SCH}/N_{SCH}) \text{ [dB]} \quad \text{[Formula 7]}$$

where
pilot symbol: pilot channel after demodulation
$S_{SCH}$: signal power at timing of transmitting synchronization channel
$N_{SCH}$: noise power at timing of transmitting synchronization channel
Pilot SNR$_{SCH}$: SNR of pilot channel at timing of transmitting synchronization channel
$N_2$: number of pilot channel symbols used to obtain SNR$_{SCH}$
i': each symbol number of pilot channel assumed i=10×i', where each i=0 indicates pilot channel symbol number at the head portion of slot (with respect to i, refer to explanation of expression of [Formula 3])
j': initial number of pilot channel symbol number used to obtain Pilot SNR$_{SCH}$ are defined.

Note that with respect to an SNR of a pilot channel detected at timing other than the timing of transmitting the synchronization channel, the processing indicated in the expressions of [Formula 1], [Formula 2] and [Formula 3] is applied.

Further, in this embodiment, the synchronization channel noise ratio is calculated based on the following expression using the SNR (SNR$_{SCH}$) of the pilot channel at the timing of transmitting the synchronization channel and the SNR of the pilot channel including the timing other than the timing of transmitting the synchronization channel (step S11).

$$\text{Noise\_Ratio=Pilot\_SNR-Pilot\_SNR}_{SCH}\text{[dB]} \quad \text{[Formula 8]}$$

Returning to the explanation of the flow chart of FIG. 5, it is judged from the synchronization channel noise ratio calculated in step S12 whether or not to change the threshold value set that is the combination of threshold values at the time of determining the channel quality (step S13). FIG. 6 is a table showing an example of correspondence between the channel quality and the threshold value according to this embodiment. In this example, three combinations of set 1, set 2 and set 3 are provided as the threshold value sets, and channel quality values in 31 stages from 0 to 30 are obtained, respectively. Each set includes different threshold values to determine the values in those 31 stages. Specifically, threshold values A, B, . . . , and I are used when the threshold value set 1 is selected, threshold values A', B', . . . , and I' are used when the threshold value set 2 is selected, and threshold values A", B", . . . , and I" are used when the threshold value set 3 is selected.

In step S13, as the processing of selecting a threshold value set based on the synchronization channel noise ratio, the calculated synchronization channel noise ratio is, for example, categorized into three classes of large, medium and small. Then, the threshold value set 1 is used when the synchronization channel noise ratio is categorized as small, the threshold value set 2 is used when the synchronization channel noise ratio is categorized as medium, and the threshold value set 3 is used when the synchronization channel noise ratio is categorized as large.

Further, the threshold value set presently used is compared with the selected threshold value set, and the threshold value set to be used is changed to the newly selected one when the result of comparison shows difference (step S14). The threshold value set to be used remains unchanged when the result of the comparison shows no difference.

After changing (or not changing) the threshold value set, the channel quality values in the 31 stages can be obtained using the threshold values in the threshold value set which is thus set (step S15). The data on the channel quality value obtained in this manner is transmitted to the base station.

By thus detecting the channel quality, the accurate channel quality in which the influence of the synchronization channel is taken into consideration can be detected. It should be noted that a pilot channel symbol used to calculate the Pilot SNR (SNR of pilot channel) and a pilot channel symbol used to calculate the Pilot $SNR_{SCH}$ (SNR of pilot channel at timing of transmitting synchronization channel) are different from each other, however, the same calculation method is used. Accordingly, since the White Gaussian Noise becomes influential as the noise component in the case of no large fluctuation in the channel condition of the calculation interval, the Pilot SNR (SNR of pilot channel) and the Pilot $SNR_{SCH}$ come close to correspond with each other and the value of the synchronization channel noise ratio becomes small. On the other hand, when the noise caused by the synchronization channel becomes influential, the value of the synchronization channel noise ratio becomes large. Accordingly, the ratio of the White Gaussian Noise noise to the synchronization channel noise ratio can be calculated from the synchronization channel noise ratio.

Figure 7:
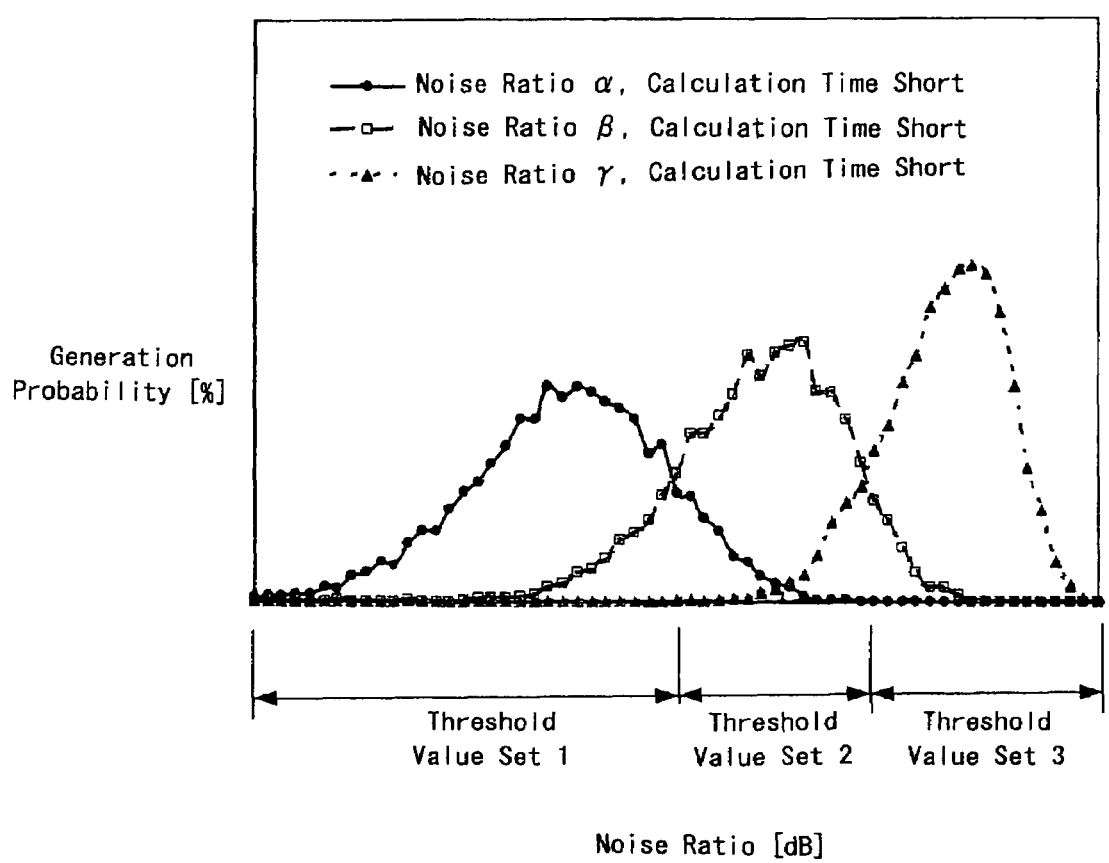
FIG. 7 is an explanatory diagram showing an example of generation probability of noise ratio when a calculation time is short according to an embodiment of the present invention.
Figure 8:
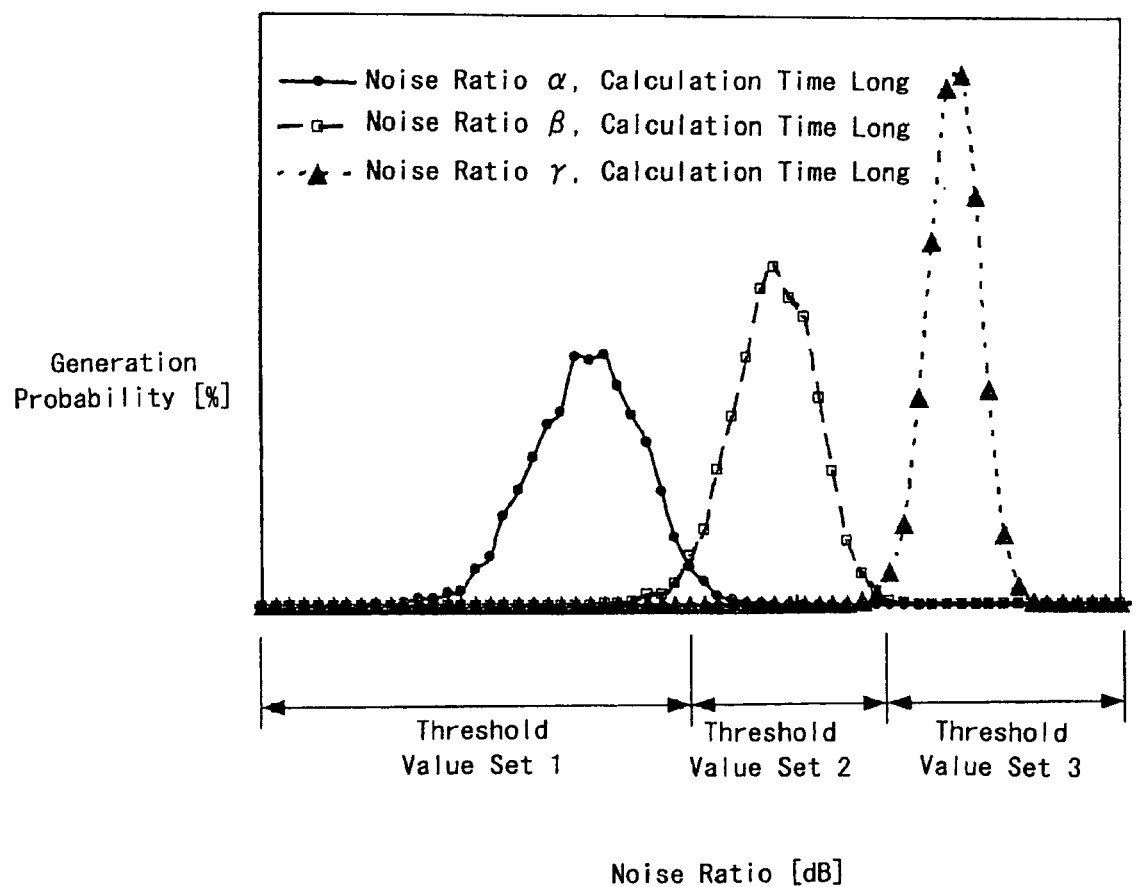
FIG. 8 is an explanatory diagram showing an example of generation probability of noise ratio when the calculation time is long according to an embodiment of the present invention.

FIGS. 7 and 8 show the results of simulating generation probability of synchronization channel noise ratio when the noise ratio is fixed to $\alpha$, $\beta$, and $\gamma$, respectively. With respect to the ratio of the White Gaussian Noise, $\alpha$ is the highest (the ratio of noise caused by the synchronization channel is small), and the ratio of the White Gaussian Noise of $\gamma$ is the lowest (the ratio of noise caused by the synchronization channel is large). In addition, the calculation interval to obtain the synchronization channel noise ratio is shorter in the results shown in FIG. 7 as compared with the results shown in FIG. 8. Specifically, each value of N1 and N2 in the expressions described above is small. Accordingly, less dispersion is observed in the synchronization channel noise ratio in the results of FIG. 8 and a threshold value set can be set more accurately.

As shown in FIGS. 7 and 8, distribution of the synchronization channel noise ratio varies depending on the noise ratio, and the noise ratio is estimated based on the synchronization channel noise ratio. The above-described classification of synchronization channel noise ratio into large, medium and small is made with a value of the Noise Ratio indicating a point where respective distributions intersect in each of FIG. 7 and FIG. 8 as a boundary point, for example. Examples in which the threshold value sets are selected in this manner are described in FIGS. 7 and 8.

Specific noise ratio corresponds to each of the above-described synchronization channel noise ratios of large, medium and small. As the threshold value set corresponding to the classification, values obtained in an environment of the corresponding noise ratio is used. Specifically, when the noise ratio $\alpha$, the noise ratio $\beta$ and the noise ratio $\gamma$ respectively correspond to small, medium and large of synchronization channel noise ratios, the threshold value set 1 is obtained in the condition where the noise ratio is $\alpha$. The threshold value set 2 is obtained in the condition where the noise ratio is $\beta$. Similarly, the threshold value set 3 is obtained in the condition where the noise ratio is $\gamma$. The threshold value set 1 is used as a threshold value set in an initial state, for example. Alternatively, a threshold value set used last time may be used in an initial state.

In addition, the calculation intervals in FIGS. 7 and 8 may be changed, for example, based on the estimation result in the channel state estimation unit 24 shown in FIG. 4. The longer the calculation time is, the more accurate the presumption becomes. However, when the channel state changes frequently, it is difficult to make the calculation time longer. By changing in this manner, the estimation (detection) can be performed as accurate as possible in accordance with the channel state.

In addition, respective distributions are overlapped in part in the example of FIG. 7. This shows a possibility of incorrect categorization when dividing into classes. When the channel state changes frequently and it is difficult to make the calculation interval longer, the number of classes may be decreased to reduce inaccurate estimation. Specifically, three classes of the threshold value sets 1, 2 and 3 are provided in the example of FIG. 7, the number of classes may be reduced to two.

On the contrary, a larger number of threshold value sets may be prepared and the threshold value sets are changed more frequently, allowing unavoidable incorrect categorization when classified. For example, another noise ratio may be classified between $\alpha$ and $\beta$, and between $\beta$ and $\gamma$, respectively, in FIG. 8 to minutely set five threshold value sets.

Further, when changing the calculation interval, calculated statistics may be used instead of changing the above-described $N_1$ and $N_2$ to reduce the dispersion of estimation. For example, the statistics of the Pilot SNR and the Pilot $SNR_{SCH}$ can be taken.

Further, the symbol position of each slot used when obtaining the noise ratio is not limited to that of the above-described embodiment. The SNR obtained using the second through tenth symbols of each slot may also be used. Similarly, the symbol used when calculating the Data SNR that is the SNR of the user data channel is not limited either. Although all the symbols are used in the above-described embodiment, only the second through the tenth symbols of each slot may be used.

Moreover, assuming a case of multi-path, the Pilot $SNR_{SCH}$ may be obtained with the pilot symbols influenced by the synchronization channel being first two symbols of each slot. Alternatively, symbols to be used may be changed between the case of multi-path and the case of single-path.

Furthermore, the above-described embodiment is an example of the case where high speed data transmission is performed from a base station to a terminal by applying the present invention to the transmission of the HSDPA method in the UMTS system that is the wireless telecommunication system to which the W-CDMA method is applied, however, needless to say the present invention can be applied to wireless data transmission of other methods. This invention can be applied to wireless data communication of various methods other than the wireless telecommunication as long as a method is basically a CDMA method having a synchronization channel.

It should be understood by those skilled in the art that various modifications, combinations, sub-combinations and alterations may occur depending on design requirements and other factors insofar as they are within the scope of the appended claims or the equivalents thereof.

What is claimed is:

1. A channel quality estimation method for estimating a channel quality of a signal transmitted by a Code Division Multiple Access method and for estimating the channel quality in a system having a synchronization channel not orthogonal to a channel which receives data, comprising:

estimating a noise component of a desired channel to provide an estimated noise by a noise estimation unit;

estimating a degree of a noise component caused by the synchronization channel with respect to said estimated noise to provide an estimated degree of the noise component;

detecting the channel quality of a receiving channel based on said estimated degree of the noise component; and determining a final value of channel quality by comparing the detected channel quality to a set of threshold values, wherein the set of threshold values is selected from among a plurality of sets of threshold values that are associated with a same channel quality value and changed based on the estimated degree of the noise component.

2. A channel quality estimation method according to claim 1, wherein a channel quality table for obtaining the channel quality is provided, and the channel quality of the receiving channel is detected from said estimated degree of the noise component by referring to said channel quality table.

3. A channel quality estimation method according to claim 1, wherein said degree of the noise component is estimated by calculating a signal to noise ratio of said synchronization channel.

4. A channel quality estimation method according to claim 1, wherein said of degree of the noise component is estimated by judging a channel state of said receiving channel.

5. A channel quality estimation method according to claim 4, wherein the set of threshold values for detecting said channel quality of the receiving channel is changed in accordance with said judgment of the channel state.

6. A channel quality estimation method according to claim 1, wherein a reference time for estimating said noise component of the desired channel is changed in accordance with said judgment of the channel state.

7. A receiving apparatus to receive a signal transmitted by a Code Division Multiple Access method and to estimate a channel quality in a system having a synchronization channel not orthogonal to a channel which receives data, comprising:

noise component estimation means for estimating a noise component of a desired channel;

synchronization channel noise degree estimation means for estimating a degree of the noise component caused by the synchronization channel with respect to the noise component estimated by said noise component estimation means;

channel quality detection means for detecting the channel quality of a receiving channel based on the degree of the noise component estimated in said synchronization channel noise degree estimation means; and final channel quality value determining means for detecting a final channel quality value by comparing the detected channel quality to a set of threshold values, wherein the set of threshold values is selected from among a plurality of sets of threshold values that are associated with a same channel quality value and changed based on the estimated degree of the noise component.

8. A receiving apparatus according to claim 7, wherein said channel quality detection means includes a channel quality table for obtaining the channel quality, and the channel quality of the receiving channel is detected from degree of the noise component estimated by said synchronization channel noise degree estimation means by referring to said channel quality table.

9. A receiving apparatus according to claim 7, wherein degree of the noise component is estimated in said synchronization channel noise degree estimation means by calculating a signal to noise ratio of said synchronization channel.

10. A receiving apparatus according to claim 7, wherein degree of the noise component is estimated in said synchronization channel noise degree estimation means by judging a channel state of the receiving channel.

11. A receiving apparatus according to claim 10, wherein the set of threshold values for detecting the channel quality of the receiving channel is changed in accordance with said judgment of the channel state.

12. A receiving apparatus according to claim 10, wherein a reference time for estimating the noise component is changed in said noise component estimation means in accordance with said judgment of the channel state.

13. A receiving apparatus to receive a signal transmitted by a Code Division Multiple Access method and to estimate a channel quality in a system having a synchronization channel not orthogonal to a channel which receives data, comprising:

a noise component estimation unit configured to estimate a noise component of a desired channel;

a synchronization channel noise degree estimation unit configured to estimate a degree of the noise component caused by the synchronization channel with respect to the noise component estimated by said noise component estimation unit;

a channel quality detection unit configured to detect a channel quality of a receiving channel based on the degree of the noise component estimated in said synchronization channel noise degree estimation unit; and a final channel quality value determining unit configured to determine a final channel quality value by comparing the detected channel quality to a set of threshold values, wherein the set of threshold values is selected from among a plurality of sets of threshold values that are associated with a same channel quality value and changed based on the estimated degree of the noise component.

* * * * *